US007065499B1

(12) United States Patent
Seth et al.

(10) Patent No.: US 7,065,499 B1
(45) Date of Patent: Jun. 20, 2006

(54) INTELLIGENT ORDER PROMISING (75) Inventors: Vineet Seth, Arlington, MA (US);
Aamer Rehman, Flower Mound, TX (US)

(73) Assignee: i2 Technologies US, Inc., Dallas, TX (US)

( * ) Notice: Subject to any disclaimer, the term of this patent is extended or adjusted under 35 U.S.C. 154(b) by 311 days.

(21) Appl. No.: 09/949,378

(22) Filed: Sep. 7, 2001

Related U.S. Application Data (60) Provisional application No. 60/277,409, filed on Mar. 19, 2001.

(51) Int. Cl.
*G06Q 30/00* (2006.01)

(52) U.S. Cl. .......................................... 705/26; 705/27
(58) Field of Classification Search ................ 705/26, 705/27, 28
See application file for complete search history.

(56) References Cited

U.S. PATENT DOCUMENTS

| | | | |
|---|---|---|---|
| 4,209,845 A | 6/1980 | Berger et al. ............... | 364/900 |
| 4,611,280 A | 9/1986 | Lindermann ................ | 364/300 |
| 4,611,310 A | 9/1986 | Durbin ........................ | 365/230 |
| 4,737,910 A | 4/1988 | Kimbrow .................... | 364/403 |
| 4,827,423 A | 5/1989 | Bealsey et al. ............. | 364/468 |
| 4,992,940 A * | 2/1991 | Dworkin ....................... | 705/26 |
| 5,041,972 A | 8/1991 | Frost ........................... | 364/401 |
| 5,089,970 A | 2/1992 | Lee et al. .................... | 364/468 |
| 5,101,352 A | 3/1992 | Rembert ..................... | 364/401 |
| 5,128,861 A | 7/1992 | Kagami et al. .............. | 364/403 |
| 5,148,370 A | 9/1992 | Litt et al. ..................... | 364/468 |
| 5,175,857 A | 12/1992 | Inoue ........................... | 395/800 |
| 5,216,612 A | 6/1993 | Cornett et al. .............. | 364/468 |
| 5,218,700 A | 6/1993 | Beechick ..................... | 395/700 |
| 5,233,533 A | 8/1993 | Edstrom et al. ............. | 364/468 |
| 5,237,496 A | 8/1993 | Kagami et al. .............. | 364/401 |
| 5,280,425 A | 1/1994 | Hogge ......................... | 364/402 |
| 5,303,144 A | 4/1994 | Kawashima et al. ........ | 364/401 |
| 5,305,199 A | 4/1994 | LoBiondo et al. ........... | 364/403 |

(Continued)

FOREIGN PATENT DOCUMENTS

| | | |
|---|---|---|
| EP | 0 025 405 | 5/1980 |

(Continued)

OTHER PUBLICATIONS carmax.com webpages dated prior to Mar. 2, 2001 retrieved from archive.org.*

(Continued)

*Primary Examiner*—Lynda Jasmin
(74) *Attorney, Agent, or Firm*—Steven J. Laureanti; James E. Walton (57) ABSTRACT

An order promising system (10) includes a commerce module (16) that receives a product inquiry from a user. The product inquiry includes a product configuration that includes a product identifier, one or more option values, and the delivery location for the product. The system (10) also includes one or more inventory engines (12) that receive the product configuration from the commerce module (16) and identify one or more products in the inventory of one or more sellers that exactly or partially match the product configuration based on one or more matching rules. The inventory engines (12) also determine a delivery date for each matching product and communicate the matching products and associated delivery dates to the commerce module (16). The commerce module (16) communicates the matching products and associated delivery dates to the user, receives a request for one of the matching products from the user, and communicates the request to the inventory engine (12), which receives the request and commits the requested product to the user.

33 Claims, 2 Drawing Sheets

U.S. PATENT DOCUMENTS

| | | | | |
|---|---|---|---|---|
| 5,321,833 A * | 6/1994 | Chang et al. | | 707/5 |
| 5,343,388 A | 8/1994 | Wedelin | | 364/402 |
| 5,369,570 A | 11/1994 | Parad | | 364/401 |
| 5,440,479 A | 8/1995 | Hutton | | 364/401 |
| 5,570,291 A | 10/1996 | Dudle et al. | | 364/268.01 |
| 5,594,639 A | 1/1997 | Atsumi | | 364/468.14 |
| 5,630,070 A | 5/1997 | Dietrich et al. | | 395/208 |
| 5,712,985 A | 1/1998 | Lee et al. | | 395/207 |
| 5,712,989 A | 1/1998 | Johnson et al. | | 395/228 |
| 5,715,444 A | 2/1998 | Danish et al. | | 395/604 |
| 5,734,890 A | 3/1998 | Case et al. | | 395/605 |
| 5,758,329 A | 5/1998 | Wojcik et al. | | 705/28 |
| 5,765,143 A | 6/1998 | Sheldon et al. | | 705/28 |
| 5,809,144 A | 9/1998 | Sirbu et al. | | 380/25 |
| 5,826,260 A * | 10/1998 | Byrd et al. | | 707/5 |
| 5,845,258 A | 12/1998 | Kennedy | | 705/8 |
| 5,873,076 A * | 2/1999 | Barr et al. | | 707/3 |
| 5,918,213 A * | 6/1999 | Bernard et al. | | 705/26 |
| 5,946,210 A | 8/1999 | Montminy et al. | | 364/468.03 |
| 5,960,414 A | 9/1999 | Rand et al. | | 705/28 |
| 5,963,920 A | 10/1999 | Rose et al. | | 705/28 |
| 5,963,953 A | 10/1999 | Cram et al. | | 707/102 |
| 5,970,474 A | 10/1999 | LeRoy et al. | | 705/27 |
| 5,979,757 A | 11/1999 | Tracy et al. | | 235/383 |
| 5,995,947 A | 11/1999 | Fraser et al. | | 705/38 |
| 5,999,908 A | 12/1999 | Abelow | | 705/1 |
| 6,009,406 A * | 12/1999 | Nick | | 705/10 |
| 6,009,407 A | 12/1999 | Garg | | 705/10 |
| 6,012,041 A | 1/2000 | Brewer et al. | | 705/28 |
| 6,012,051 A | 1/2000 | Sammon, Jr. et al. | | 706/52 |
| 6,016,504 A | 1/2000 | Arnold et al. | | 709/200 |
| 6,035,305 A | 3/2000 | Strevey et al. | | 707/104 |
| 6,049,777 A | 4/2000 | Sheena et al. | | 705/10 |
| 6,055,519 A | 4/2000 | Kennedy et al. | | 705/80 |
| 6,064,980 A | 5/2000 | Jacobi et al. | | 705/26 |
| 6,085,165 A | 7/2000 | Ulwick | | 705/7 |
| 6,085,170 A | 7/2000 | Tsukuda | | 705/26 |
| 6,167,380 A | 12/2000 | Kennedy et al. | | 705/10 |
| 6,167,383 A * | 12/2000 | Henson | | 705/26 |
| 6,188,989 B1 | 2/2001 | Kennedy | | 705/8 |
| 6,195,652 B1 | 2/2001 | Fish | | 707/2 |
| 6,226,652 B1 | 5/2001 | Percival | | 707/203 |
| 6,249,774 B1 | 6/2001 | Roden et al. | | 705/28 |
| 6,321,133 B1 | 11/2001 | Smirnov et al. | | 700/100 |
| 6,324,522 B1 | 11/2001 | Peterson et al. | | 705/28 |
| 6,405,308 B1 | 6/2002 | Gupta et al. | | 713/1 |
| 6,463,345 B1 | 10/2002 | Peachy-Kountz et al. | | 700/99 |
| 6,484,165 B1 * | 11/2002 | Beall et al. | | 707/3 |
| 6,505,172 B1 * | 1/2003 | Johnson et al. | | 705/27 |
| 6,519,648 B1 * | 2/2003 | Eyal | | 709/231 |
| 6,567,820 B1 * | 5/2003 | Scheifler et al. | | 709/315 |
| 6,601,043 B1 * | 7/2003 | Purcell | | 705/26 |
| 2001/0044769 A1 * | 11/2001 | Chaves | | 705/37 |
| 2001/0047285 A1 | 11/2001 | Borders | | 705/8 |
| 2001/0047303 A1 * | 11/2001 | Greenstone | | 705/22 |
| 2002/0013721 A1 | 1/2002 | Dabbiere et al. | | 705/7 |
| 2002/0019761 A1 | 2/2002 | Lidlow | | 705/10 |
| 2002/0029168 A1 * | 3/2002 | McConnell et al. | | 705/26 |
| 2002/0049622 A1 | 4/2002 | Lettich et al. | | 705/7 |
| 2002/0082931 A1 * | 6/2002 | Siegel et al. | | 705/26 |
| 2002/0188499 A1 * | 12/2002 | Jenkins et al. | | 705/10 |

FOREIGN PATENT DOCUMENTS

| | | |
|---|---|---|
| EP | 0 231 552 | 12/1986 |
| EP | 0 425 405 | 5/1991 |
| EP | 0 463616 | 6/1991 |
| EP | 0 466 089 | 7/1991 |
| EP | 0 466 090 | 7/1991 |
| EP | 0 615 198 | 9/1994 |
| GB | 2 293 902 | 4/1996 |
| WO | WO 00/17795 | 3/2000 |

OTHER PUBLICATIONS

Nicholls, M.G., "The Determination of the Optimal Component Input Numbers for the Completion of a Single Manufacturing Order" European Journal of Operation Research, vol. 87, No. 1, p. 122-31, Dialog File 2 #06121559.*

Allen, Supply Chain Management Software, May 1998, University of Texas, Austin http://esallen.home.mindspring.com/erp.SCH.htm.

Available to Promise (ATP) http://sandbox.aiss.uiuc.edu/oracle/nca/mrp.atp.htm, Unknown.

Anonymous, "Concentra and i2 Technologies to Integrate Sales Configuration with Global Supply Chain Management; Project Configuration Recognized as Critical . . . ," Business Wire, Oct. 10, 1995 (2 pages).

Anonymous, MRP upstaged One Trend in the Software Industry is that the Top Enterprise-Resource-Planning Software Companies are Outright Supplanting the Core Planning functions of their manufacturing-resource planning: MRP III, Industry Week, v. 246, n. 3, Feb. 3, 1997, 3 pages.

Anonymous, "Intelligent Manufacturing Report", Intelligent Manufacturing, vol. 1, No. 3,3 pages, Mar. 1995.

carmax.com, webpages dated prior to Mar. 2, 2001 retrieved from archive.org, 10 pages, Unknown.

Cavallaro, Dialog file 621 (Gale Group New Prod. Annou. (R)), No. 1007808, "New Para Research MRP II System Adapts Itself to your Business", PR Newswire, 4 pages Aug. 13, 1995.

Castagna, "A Model for Evaluating Manufacturing System Time by Performances," Integrated Manufacturing System, vol. 3, No. 3, pp. 15-21, 1992.

Davis, "Tough Customers," Manufacturing Systems, Wheaton, 6 pages, Nov. 1994.

Funaki, et al., "Method and System for Production Planning Transaction," JP02001331693A, EAST Version 1.03.0002, 58 pages, Apr. 9, 2002.

Foxlow "Knowledge-Based Manufacturing: The Key to Recover", Logistics Information Management vol. 7, No. 4, pp. 23-26, 1994.

Greene, "MRP II: Out with the Old . . . ; Available: Real-Time EDI, Multiplant Functions, More; MRP II Software Systems; How to Negotiate the Right Price," Computerworld, Framingham, 7 pages, Jun. 8, 1992.

Hammel, et al, y chain, Production and Inventory Management Journal, Second Quarter, Duns: 00-912-2532, ISSN 08978336, 9 pages, http://proquest.umi.com/pqdweb?TS=989416...&Fmt=3&Sid=9&Idx=28&deli=1&ROT=309&Dtp=1, 1993 Printed out May 9, 2001.

Jasany, "Cut Costs with Integrated Software" Automation, Oct. 1987, vol. 34, No. 10, p. 62.

Morton, "The uses of time," The Economist, London, V. 330, Issue 7853, 4 pages, Mar. 5, 1994.

McClelland Using Simulation to Facilitate Analysis of Manufacturing Strategy, Journal of Business Logistics, vol. 13, No. 1, pp. 215-237, 1992.

McClutcheon et al. "The Customization-Responsiveness Squeeze," Sloan Management Review, vol. 35, No. 2, pp. 89-99, Winter 1994.

Parker, Demand Management and Beyond Supplement pp. 2A-14A, Jun. 1996.

Parker, What New Tools will Best Save Time, Manufacturing Systems, Wheaton, vol. 12, Issue 1, 6 pages, Nov. 1991.

Rhodes, Dusty, "The Keys to the Enterprise: Integrated Applications Drive Information Systems to New Horizons," HP Professional, vol. 5, No. 11, pp. 44-46, Nov. 1991, Jun. 11, 1990.

Smith, Frank, "Dun & Bradstreet Software Delivers Sales and Promotion System Manufacturer," Business Wire, s 1, p. 1, Jun. 11, 1990, 1998.

SAP Annual Report—1998, SAP Ag. http://www.sap-ag.de/company/investor/reports/ar_onlin/1998/init_e.asp.

Unknown, "Rhythm," a series of i2 Technologies' web pages, http://web.archive.org/web/19980526040159/http://www.i2.com/, 23 pages, Apr. 23, 1998.

* cited by examiner

INTELLIGENT ORDER PROMISING

RELATED APPLICATIONS

This application claims the benefit under 35 U.S.C. § 119(e) of U.S. Provisional Application Ser. No. 60/277,409 filed on Mar. 19, 2001.

TECHNICAL FIELD OF THE INVENTION

This invention relates to the field of business transactions and decision support, and more particularly to intelligent order promising which provides locate-to-order, configure-to-order, and build-to-order fulfillment strategies in a single solution.

BACKGROUND OF THE INVENTION

Many companies provide web-based resources that allow their buyers to place orders for products offered by the company. After receiving an order for a product, the company may then provide a promise to the buyer regarding the delivery date of the ordered product. Order promising typically involves two steps. The first step involves selecting a product and desired product options using an electronic "shopping cart" or other e-commerce tool on the Internet and sending the order to an internal order management system associated with the company. The second step involves the company determining where the ordered product exists in inventory and coordinating the delivery of the product to the buyer. The buyer is often given a promise date for delivery either immediately after placing the order or after the seller locates the product in inventory. If the promise is made immediately after receiving the order, the promised delivery date is typically based on the assumption that the item is in inventory and the assumption of a fixed lead-time for delivery to the buyer. Both of these assumptions are significant and thus the promised delivery date is not reliable. If the promise date is given after the seller has located the item in inventory, the promise date is more reliable; however, the date is not given to the buyer in real-time.

There are several disadvantages with the typical order promising methods described above. For example, the buyer is unable to ensure that the configured order is "legal" (a valid order including valid product specifications or options). In addition, the buyer is unable to check, in real-time, the availability of the ordered product in the seller's inventory or the production status of the ordered product. Furthermore, the seller is unable to provide the buyer with a reliable, real-time promise date. Due to these disadvantages, buyers may be dissatisfied with the product ordering process and not return to a particular seller.

SUMMARY OF THE INVENTION

According to the present invention, disadvantages and problems associated with previous order promising techniques have been substantially reduced or eliminated.

According to one embodiment of the present invention, an order promising system includes a commerce module that receives a product inquiry from a user. The product inquiry includes a product configuration that includes a product identifier, one or more option values, and the desired delivery date and location for the product. The system also includes one or more inventory engines that receive the product configuration from the commerce module and identify one or more products in the inventory of one or more sellers that exactly or partially match the product configuration based on one or more matching rules. The inventory engines also determine a delivery date for each matching product and communicate the matching products and associated delivery dates to the commerce module. The commerce module communicates the matching products and associated delivery dates to the user, receives a request for one of the matching products from the user, and communicates the request to the inventory engine, which receives the request and commits the requested product to the user.

Particular embodiments of the present invention provide one or more technical advantages. For example, certain embodiments provide a real-time order promising solution that intelligently captures a buyer query (including preferences as to particular product features or options), searches both inventory information and production schedules for product matches, and returns exact and partial matches and associated promised delivery dates to the buyer. If a buyer decides to commit to one of the returned matches, the buyer may then submit a request for the product. Particular embodiments may then automatically change the ordered product's status in the appropriate inventory or production matching engine to "committed" and may send a transaction identifying the order to an order management system associated with the seller.

Certain embodiments of the present invention thus provide improved buyer service by providing buyers with: visibility into the availability of the desired product at the seller (both in inventory and in production), a guaranteed promise delivery date in real-time, and multiple partial matches if an exact product match cannot be found. Particular embodiments may also provide a reduction in inventory at the seller by providing the ability to push inventory out by searching multiple sellers' inventory information as well as by determining attractive up-sell/cross-sell possibilities relative to buyer preferences. Furthermore, inventory may be reduced since buyers can purchase products in production before they even become inventory. Embodiments of the present invention may also reduce transportation costs associated with moving inventory from one seller to another since there is less uncommitted inventory and since the relevance of products matches may be based, in part, on required transportation distance. Moreover, certain embodiments may improve forecasting processes since sellers may have direct access to buyer requests.

Other technical advantages may be readily apparent to those skilled in the art from the figures, description and claims included herein.

BRIEF DESCRIPTION OF THE DRAWINGS

To provide a more complete understanding of the present invention and the features and advantages thereof, reference is made to the following description taken in conjunction with the accompanying drawings, in which.

DESCRIPTION OF EXAMPLE EMBODIMENTS

Figure 1:
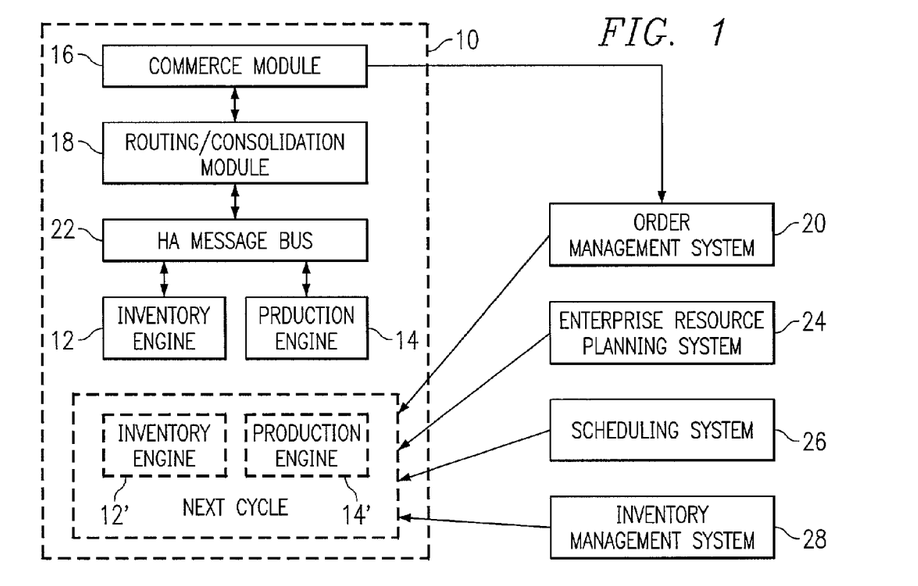
FIG. 1 illustrates an example real-time order promising system.

FIG. 1 illustrates an example intelligent order promising system 10 that provides a comprehensive build-to-order, locate-to-order, and configure-to-order fulfillment strategy. System 10 may be used to provide visibility to a buyer regarding the availability of a desired product (both in inventory and in production) in response to a product query, provide a guaranteed promise delivery date of a product to the buyer in real-time, provide multiple partial product matches if an exact product match cannot be found, and allow the buyer to place an order for a product. A buyer may directly access system 10, may go to a seller having access to system 10 and the seller may then use system 10 to meet buyer requests and orders, or system 10 may be accessed in any other appropriate manner.

System 10 may receive a product query (including preferences as to particular product features or options) from a buyer, search both product inventory information and product production schedules for product matches, and return the partial matches and associated promised delivery dates to the buyer. The term "product" is meant to include goods, real property, services, information, and any other suitable tangible or intangible items. System 10 receives the buyer's product preferences and finds a corresponding product in inventory or in production that exactly or partially meets the buyer's configuration, delivery, and price requirements and that has a delivery path that results in minimal supply chain costs to the seller and suppliers. Supply chain costs may include inventory storage costs, transportation costs, manufacturing costs, and supplier-related stability costs. System 10 can translate these costs into constraints with associated penalties for violating the constraints.

System 10 may perform parametric or attribute based product matching at the product option level. Uncommitted products identified in the inventory information may be searched and matched based on their existing option values, some of which the seller may be able to modify to more closely match a buyer query. Furthermore, uncommitted or forecasted products in the production schedule may be searched and potentially reconfigured, while respecting manufacturing and supply-chain stability constraints, in order to match a buyer's requested configuration. If a buyer decides to commit to one of the returned matches, the buyer may then submit a request for the product. Particular embodiments may then automatically change the ordered product's status in the appropriate inventory or production matching engine to "committed" and may send a transaction identifying the product order to an order management system associated with the seller.

To perform the searching and matching functions described above, system 10 includes an inventory matching engine 12 and a production matching engine 14. As an example only, inventory matching engine 12 may be an available-to-promise (ATP) engine and production matching engine 14 may be a configure-to-promise (CTP) engine. System 10 also includes a commerce module 16 and a routing/consolidation module 18. Commerce module 16 may provide a front-end web interface that allows a buyer to access system 10 using the Internet or any other appropriate communication networks. For example, a buyer may access a system 10 associated with a particular seller or a group of sellers (such as in an electronic marketplace). Commerce module 16 may also provide order validation and pricing functions. Routing/consolidation module 18 may include a brokering engine that routes buyer communications to the appropriate engine 12 and/or 14 as well as a filtering engine that pulls search results from multiple engines 12 and/or 14 and consolidates them into one list for buyer evaluation. Furthermore, as described below, system 10 may be implemented using a high availability architecture that provides fault tolerance for hardware, software, and database failures so that system 10 may be available to buyers at all times. Engines 12 and 14, commerce module 16, and routing/consolidation module 18 may each be implemented using any appropriate combination of hardware and/or software operating in association with one or more computers at one or more locations.

Commerce module 16 provides various functions that enable an e-commerce transaction. For example, commerce module 16 may provide a "shopping cart" that may be used to temporarily store desired product matches. This may trigger temporary reservations in engines 12 and 14 until the buyer decide whether to place an order. Commerce module 16 may also provide "shopping list" that may be used to store the buyer's saved product configurations for an extended period of time (a buyer can log out of system 10 and then log in later and initiate a search on one of these configurations). Commerce module 16 may also provide a user interface for buyers to view multiple returned matches and compare each to the original configuration. Furthermore, commerce module 16 may provide a pricing module that computes the cost associated with a given product configuration. The cost may be based on product prices provided by one or more sellers and these prices may reflect appropriate discounts, incentives, or other factors. A configurator may also be provided that may be used to capture custom configurations as order "images", verify that the configurations are legal configurations based on configuration rules, and submit the configurations to routing/consolidation module 18 for communication to an appropriate engine 12 and/or 14. Later, when engine 12 and/or 14 returns one or more product matches, the configurator may check the legality of the matches and the pricer may be used to re-price the matches. The results of these checks may then be used by routing/consolidation module 18 to filter through the returned matches and determine which matches should be shown to the buyer. The configurator or another commerce module component may also be responsible for submitting a committed user order to a corporate order management system (OMS) 20 and notifying engines 12 and 14 when this handoff occurs so that the engines 12 and 14 know what OMS data is valid relative to their own data.

Routing/consolidation module 18 receives an order image from the configurator and brokers the order to the appropriate engine(s) 12 and/or 14. For a product query, engines 12 and 14 send appropriate results back to routing/consolidation module 18 after product matches are determined. Routing/consolidation module 18 then uses filtering logic to combine the results and communicates the aggregate results to the configurator. For example, routing/consolidation module 18 may combine the results from multiple engines and then order the results according to one or more criteria (such as price, closest match, delivery date, and/or any other appropriate criteria). For a product request (or cancellation of a product order), after the appropriate engine 12 or 14 is successful or unsuccessful in reserving (or canceling) the requested (or cancelled) product order, the engine 12 or 14 responds positively or negatively to routing/consolidation module 18, and routing/consolidation module 18 communicates this message to commerce module 16. Therefore, routing/consolidation module 18 serves a communications broker between engines 12 and 14 and commerce module 16.

As described above, inventory matching engine 12 receives queries, requests, and cancellations from routing/consolidation module 18. If engine 12 receives a query, it searches inventory information of one or more sellers to identify matches to the associated order. If the transaction is a request or cancellation, engine 12 locates the associated product match or product order and commits the product match or uncommits the product order. As described below, engine 12 may use various constraints when identifying product matches using inventory information. These constraints may include asymmetric mismatch constraints (penalties associated with non-exact product matches), delays and penalties for reconfiguring product options, and distance/transit cost penalties associated with inventory locations other than at the seller with which the buyer is directly dealing (for example, the buyer may go to a seller and product queries may be performed from the seller location by the buyer or the seller).

Engine 12 may search inventory from seller inventory, in-transit inventory (designated by the seller), inventory owned by other sellers who are designated by the seller, central warehouse inventory, manufacturer plant inventory, and/or any other appropriate inventory locations. Products in inventory will have an associated delivery date since not all of the products may be immediately available. For example, inventory at a central warehouse may have an associated lead time before it may be delivered to the buyer. A product that is already located at a seller from which a buyer is requesting the product may have a delivery date that is equal to the current date, a product that is in-transit to the seller may have a delivery date equal to its predicted arrival date (calculated with a fixed lead time), a product that is located at another seller, rental shop, central warehouse, or manufacturer plant may have a delivery date equal to the current date plus a fixed, predetermined transit time, and a rental product that is in-use may have a return date to a rental shop (the delivery date may then be that return date plus a fixed, pre-determined transit time). Product matches may be sorted by delivery date so that the buyer may easily identify the products that are earliest available.

Production matching engine 14 also receives product queries, requests, and order cancellations from routing/consolidation module 18. If engine 14 receives a query, engine 14 searches for matches in the production schedule from the plant(s) where the particular product is manufactured. If the transaction is a request or order cancellation, engine 14 locates the associated product match or product order and commits the product match or uncommits the product order. Engine 14 may search for various of orders in the production schedule, including buyer committed orders, seller stock orders (not committed to buyer), and forecasted orders (seller and buyer independent). As described below, engine 14 may use various constraints when identifying product matches from production schedule information. These constraints may include asymmetric mismatch constraints, supply chain stability penalties for reconfiguring options, and production constraints (such as capacity constraints, spacing constraints, parts availability constraints, grouping constraints, and any other appropriate constraints).

Engines 12 and 14 may be implemented using a high availability (HA) architecture. The HA architecture provides fault tolerance to ensure that engines 12 and 14 are able to provide order promises at substantially all times, if appropriate. The HA architecture may provide redundant engines 12 and 14 so that if one engine 12 or 14 fails, another engine 12 or 14 may take its place. An HA message bus 22 may be provided to direct communication between engines 12 and 14 and routing/consolidation module 18 as appropriate to effectuate these HA functions. Furthermore, the redundant engines 12 and 14 may also be used for load balancing.

In addition to providing redundant engines for fault protection and load balancing, the HA architecture also provides for a controlled changeover between different groups of engines. Operating engines 12 and 14 may be replaced by replacement engines 12' and 14' so that the schedule, inventory, production, and other system information used by the operating engines 12 and 14 may be updated (or for any other appropriate reason). Based on the deployment architecture, this schedule, inventory, production, and other system information may be communicated to engines 12' and 14' by one or more OMSs 20, one or more inventory management systems 24, one or more scheduling systems 26, one or more enterprise resource planning (ERP) systems 28, and/or any other appropriate systems associated with one or more entities. To accomplish such a changeover, the HA architecture includes one or more databases that store information regarding the state of the operating engines 12 and 14 and services that have been and are being performed by the operating engines 12 and 14 (such as fulfilling product orders). Replacement engines 12' and 14' are updated with current information while the operating engines 12 and 14 continue to process transactions. Then, the replacement engines 12' and 14' replace the operating engines 12 and 14 and engines 12 and 14 are shut down. Various data synching processes, such as replay and catch-up, may be run when the updated replacement engines 12' and 14' replace operating engines 12 and 14.

The following is an example workflow that may be associated with the use of system 10. The workflow begins when a buyer goes to a seller or otherwise accesses system 10 and makes a product query, which may include a product model and specific product options. Using an appropriate interface to commerce module 16 (such as a web browser), the buyer or seller enters the buyer's product query and the query is communicated to routing/consolidation module 18. Depending on the nature of the query, routing/consolidation module 18 communicates the query to appropriate engines 12 and/or 14. Engines 12 and/or 14 then search for available targets, which are products that are currently in inventory or that will be in inventory at a specific later date. Each target consists of a product model and particular options. The targets may be grouped into search pools and engines 12 and 14 may search the targets by looking at one search pool after another. Engines 12 and 14 may search for targets based on one or more search models. A search model is a set of information that controls how engines 12 and 14 search for particular products (and which products are searched).

Engines 12 and 14 attempt to identify exact matches to the query from the targets. However, in addition to finding perfect matches when possible, engines 12 and 14 also suggest targets that include substitute options in place of the requested options and targets that the seller would have to reconfigure. Matching and reconfiguration rules/constraints may be specified to identify what the "closest" matches might be. After the potential targets are identified, system 10 determines when each of these possible targets could be available to the buyer at a given destination and provides this information to the buyer as a promised delivery date. System 10 may also provide pricing information.

When system 10 is configured, a user may establish numeric constraints and penalties that control the behavior of system 10. For example, a first type of partial match may be preferred over a second type of partial match. A larger numeric penalty could then be applied to the second type of partial match in system 10 to preferentially suggest partial matches of the first type. For example, if a buyer requests a red vehicle with a V-6 engine, two possible partial matches could be a red vehicle with a V-6 turbo engine and a red vehicle with a V-8 engine. You might prefer to suggest the V-6 turbo engine as a partial match and thus penalize a differing engine size more than the addition of a turbocharger to the requested engine size. Furthermore, an automobile seller would typically prefer to search its own inventory rather than searching any other inventory. The seller's second choice might be to search the manufacturer's inventory, and the seller's least preferred choice would be to search the inventory of other sellers. Therefore, one could specify no penalty for searching the seller's own inventory, a small penalty (a soft penalty) for searching the manufacturer's inventory, and a larger penalty (either a soft or a hard penalty) for searching the inventory of other sellers. As a result, system 10 would be more likely to return matches from the seller's own inventory than from other inventories. A soft penalty or constraint has an associated penalty that discourages, but that does not necessarily prevent, an action from being performed (such as an inventory location being searched or a product being selected as a match). A hard penalty or constraint an associated penalty that is high enough to prevent an action from being performed.

As described above, different search models may be used to control how engines 12 and 14 search for product matches. In general, a search model is a set of data associated with a specific subset of targets. Different search models can have different sets of rules, so that different rules may be used to search different types of targets (for example, inventory targets versus production targets). Furthermore, by partitioning the targets associated with different search models (even search models that use the same rules), the amount of searching that is needed is reduced and thus the response time is improved. For example, if a buyer requests a product that belongs to a specific product family, engines 12 and 14 may only need to search the targets in that product family. As described below, each search model has an associated set of options, inventory locations and transportation times, targets, search pools, and seller search rules.

Most manufacturers view their products as a set of distinct product models. Each product model may require a different manufacturing process and may have its own set of allowed variations. These variations are typically referred to as product options. When a buyer decide to purchase a product, the buyer may choose a product model and then specify the desired options. Options may belong to exclusive option groups in which each target (and thus also each product request) may include only one option from such a group. An option in an exclusive option group may represent the absence of a physical component. For example, a vehicle cannot have more than one spoiler, but it might have no spoiler. Options may also be miscellaneous options that may be present or not in any target or request, regardless of the absence or presence of any other option. For example, a miscellaneous option may be an add-on part or warranty.

Each exclusive option group may include the following information: the set of options that belong to the group; an unspecified-option rule that validates whether system 10 requires information about a particular option for a target or request; matching rules; and reconfiguration rules. Each matching rule may specify a buyer-requested option, a currently present option, and a penalty. Numeric penalties may be used to specify the relative desirability of the allowed mismatches and reconfigurations. Furthermore, the rules may allow for a penalty to be asymmetric. For example, one could specify a ten point penalty for substituting a car alarm without a flashing light if the buyer requested an alarm with a flashing light. For the opposite substitution (substituting a car alarm with a flashing light if the buyer requested an alarm without a flashing light), one could specify a fifty point penalty.

Each member (option) in an option group represents a different variation, only one of which may be present in a given target or request. For example, if a product is painted entirely in a single color, an option group could consist of red, green, silver, yellow, black, and white paint options. A group may also include a placeholder member that represents a null option. For example, an option group associated with a vehicle representing the choice of spoilers, a null option could be used for targets and requests that do not have a spoiler. Alternatively, an actual option code that has been assigned to represent the absence of a spoiler may be used. Furthermore, one or more options may not be specified by the buyer. Engines 12 and 14 may have rules associated with one or more option groups to indicate that the option group can be left unspecified and matching and reconfiguration rules may be specified to describe how engines 12 and 14 should behave when the option group is unspecified.

Each exclusive option group may have zero or more associated matching rules. Matching rules may define penalties that are incurred if requested options do not match target options. These rules ensure that the buyer is presented with target whose configurations are similar to that which the buyer specified. As described above, matching rules may include symmetric penalties and asymmetric penalties. For some sellers it is sufficient to define constant, symmetric penalties where a single penalty is associated with an option. As a result, if an option value does not match that specified by the buyer, the incurred penalty is the same no matter what other value it is. For example, if a buyer asks for a blue item, the penalty for returning a red item is the same as that for returning a white item. Also, the same penalty applies for mismatching in all directions. So the same penalty applies for replacing a red item with a blue one as for replacing a blue item with a red one.

For other sellers it may be preferred to define asymmetric penalties such that if an option value does not match that specified by the buyer, the incurred penalty is different depending on what option value is returned in its place. For example, in an order for heavy equipment where one of the options is a backup alarm, there may be three possible values associated with this option—no alarm, a base alarm without flashing light, or a deluxe alarm with flashing light. If a buyer requests a base alarm, the buyer may be doing so for safety reasons. Therefore, returning a match without a backup alarm may result in a higher penalty than returning one with the deluxe alarm. Also, if a buyer requests no alarm, the penalty for returning a match that has a base alarm may be lower than if the buyer requests a base alarm and no alarm exists on the returned match. Furthermore, matching rules associated with particular option groups may have no associated penalty for not having the requested option.

The penalty associated with returning an item with an option value that is different from what the buyer requested may be specified by the buyer or may be defined system-wide for all buyers. In other words, various preference levels that map to penalty values may be presented to the buyer for each option. When the buyer chooses a value for the option, the buyer may choose an associated preference level. An example set of preference levels may be "Must Have", "Want to Have", "Like to Have", "Don't Care", where "Must Have" maps to hard constraint, "Want to Have" maps to soft constraint (such as 100 penalty points), "Like to Have" maps to soft constraint (such as 50 penalty points), and "Don't Care" maps to no constraint (0 penalty points). Another set of preference levels may be simpler: "Very Important" and "Regular Importance", where "Very Important" maps to a hard constraint and "Regular Importance" maps to a soft constraint. If there is a need for user-defined preference levels and asymmetric penalties, as discussed above, then the actual mismatch penalty may be a linear combination of two penalty structures, one associated with the preferences and one associated with the asymmetry. For some sellers, allowing the buyer to choose a preference level may not be needed or important. It may add to the complexity of the configuration process such that when there are numerous options to configure, the process becomes too long. Alternatively, it may be assumed that the preference levels for all options are hard conflicts, so providing the buyer choices is unnecessary.

Each exclusive option group may also have zero or more reconfiguration rules. A reconfiguration rule describes an allowed reconfiguration, in which a seller removes an option from a target (in inventory or in production) and replaces it with a different option from the same option group. In general, reconfiguration requires work by the seller and delays availability to the buyer. Only certain options can be reconfigured and the set of options that can be reconfigured in inventory may be different from those that can be reconfigured in the production schedule. Also, for those in the production schedule, a lead-time must be provided if reconfiguration is necessary and this lead-time may be different for different options. Although, reconfiguration may be allowed, it is discouraged to a certain extent, since reconfiguring products in inventory results in labor costs and reconfiguring products in the production schedule may cause supply-chain instability.

Reconfiguration constraints define the rules and penalties for reconfiguring option values to match to those in a buyer's order image. There may be a progressive freeze profile for each option that indicates when the option may be modified and what the penalty is for modifying the option. This profile may be defined as a decreasing step function such that the penalty decreases the further out in the future the option value is to be reconfigured (if it is impossible to reconfigure an option, the penalty is hard conflict across all time). Furthermore, since order promising may involve reconfiguring forecasted orders in the production schedule, such reconfiguration may cause the production schedule to become infeasible. To prevent this from happening, production constraints may be captured in the matching process in production matching engine 14.

Example reconfiguration rules that may be associated with an option group may include (but are not limited to): a rule stating that a seller may replace an existing spoiler with another one, but a penalty will be applied for the time it takes to replace the spoiler (to discourage the reconfiguration); a rule stating that a seller can remove a spoiler (assuming this change does not require a significant amount of time, one could specify zero penalty or a very small penalty so that targets that already have no spoiler will be preferred); a rule stating that a seller can replace an existing battery with a different battery (assuming this change does not require a significant amount of time, one could specify zero penalty or a very small penalty so that targets that already have the correct battery will be preferred). It will be understood that numerous other appropriate reconfiguration rules may also be used.

As described above, options may be miscellaneous options instead of belonging to an exclusive option group. Miscellaneous options are options that do not have a relationship to other options. Each miscellaneous option can be present or absent in any target or request, regardless of other options in that target or request. System 10 may also provide matching and reconfiguration rules for miscellaneous options. For example, matching rules may include an unwanted-option rule that specifies a penalty associated with suggesting a target that has a miscellaneous option that the buyer has not explicitly requested. System 10 may also provide a missing-option rule that specifies a penalty associated with suggesting a target that does not have a miscellaneous option that the buyer has explicitly requested. As for reconfiguration rules, system 10 may provide an option-add rule that specifies a penalty associated with suggesting a target to which the seller would have to add a specific option in order to meet the buyer's criteria and an option-remove rule that specifies the penalty associated with suggesting a target from which the seller would have to remove a specific option in order to meet the buyer's criteria. To associate these rules with specific options, miscellaneous option groups may be created. In contrast to exclusive option groups, the purpose of these groups is solely to group options that share a common set of rules and such a grouping does not imply any relationship among the options.

As mentioned above, a number of different transactions may be performed by a buyer using system 10. Four example types of transactions that the buyer may initiate are a query, a request, an order, and a cancellation. A query is a solicitation for possible product matches without any commitment on the part of the buyer. A query may be used when the buyer simply wants to know: 1) if there is a particular product (target) in inventory or planned production (or if there is an empty slot in the production plan to manufacture the product) that matches (exactly or partially) the buyer's option requirements, and 2) the associated availability date of the product. A request involves committing a target in inventory or production that matches the buyer's product requirements or committing a production slot. A buyer may make a request after obtaining matches from a query transaction by selecting one of these matches. The target/slot may then be committed to the buyer and may not be considered in other matching processes. An order is a commitment transaction that system 10 submits to a seller's OMS system 20. An order is placed when a buyer decides to purchase a product(s) that the buyer has requested. A cancellation occurs when a buyer decides to renege on a committed order. This transaction involves finding the ordered product/slot in the appropriate engine 12 or 14 and reverting its status back to uncommitted. In particular embodiments, cancellations may only be made before an order has been submitted to the OMS 20 (otherwise cancellations may have to be entered in OMS 20 directly).

Figures 2, 4, 5:
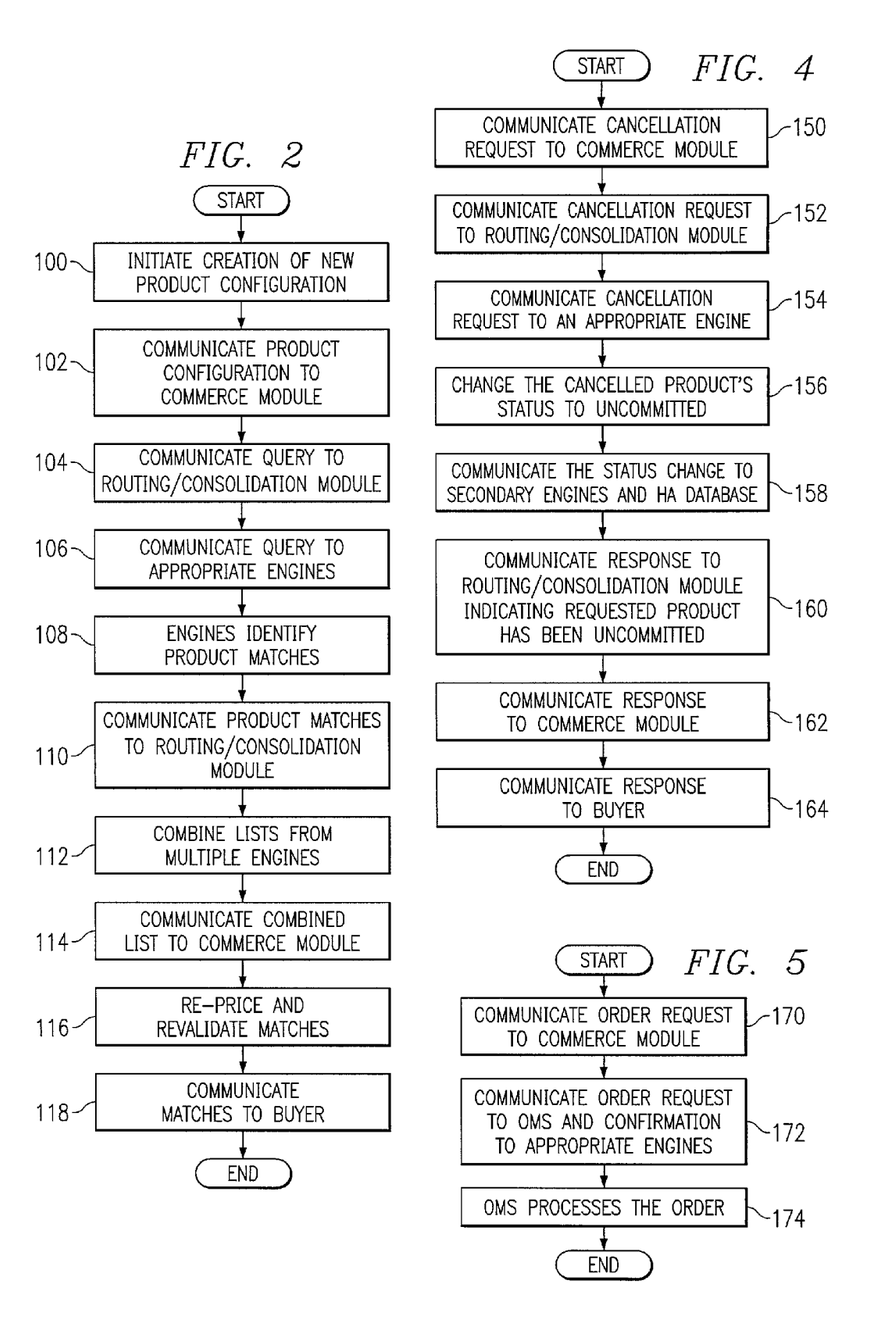
FIG. 2 illustrates an example method for performing a query transaction.
FIG. 4 illustrates an example method for performing an order transaction.
FIG. 5 illustrates an example method for performing a cancellation transaction.

FIG. 2 illustrates an example method for performing a query transaction. The method begins at step 100 when a user, such as a buyer or a party entering information for a buyer (both hereinafter referred to as "the buyer"), initiates the creation of a new product configuration using commerce module 16. The buyer may log-in to commerce module 16 using the Internet or may communicate with system 10 using an other appropriate technique. As described above, commerce module 16 may function to guide the user in the creation of the product configuration and verify that the created configuration is legal. At step 102, the buyer communicates a product configuration to commerce module 16. The product configuration may include (and commerce module may request that the user provide) some or all of the following information: a model identifier (of the base product model); a seller name and a buyer location; one or more option values; a preference level associated with one or more of the option values; search priorities; and the number of desired returned matches. At this point, the buyer may choose to store the configuration (in a shopping list) for later reference or check the current availability of targets matching this configuration.

At step 104, commerce module 16 communicates the query transaction, including the product configuration, to routing/consolidation module 18, which then communicates the query transaction to the appropriate engines 12 and/or 14 at step 106. Depending on how the inventory and production data are partitioned, multiple engines 12 and/or 14 may be used. The query may be sent to all appropriate engines 12 and 14 simultaneously in order to minimize the response time. As described above, each engine 12 and 14 may have an associated redundant engine to satisfy certain fault-tolerance and load balancing functions. The primary engine 12 or 14 may handle state transactions (those transaction that may change the state of the data, such as reserving a product for a particular buyer). The redundant (or secondary) engine(s) may only handle stateless transactions. Therefore, most queries may be submitted to the secondary engine; however, they may be handled by the primary engine.

Based on appropriate matching and/or reconfiguration rules, at step 108 each engine 12 and/or 14 identifies matches from one or more appropriate sets of targets (the engine may identify the number of desired matches specified by the buyer). For example, inventory engine 12 may search one or more inventory locations for matches. An inventory location is a physical place that stores inventory (a set of targets). For each inventory location, inventory matching engines 12 maintain information about the transportation times between the inventory location and possible destination locations. Given this data, engines 12 compute the date on which a target could be available to the buyer, at a specific destination location, as follows. Engine 12 finds the inventory location of the target and the date on which the target is available at that location. Engine 12 looks up the transportation time from the inventory location to the given destination and adds that time to the availability date. If the target must be reconfigured, engine 12 looks up the number of days required to perform the reconfiguration and adds that time to the previous date. It should be noted that the above calculation gives the earliest possible date on which the buyer may receive the target. The actual date could be later if engine 12 does not consider the seller's work schedule, including time needed to reconfigure other targets, and the availability of transportation. Similar rules may apply for searches of targets in production (or that may be produced in the future) by production matching engines 14.

Engines 12 and 14 may use search pools to search for matching targets. A search pool may be associated with one or more inventory or production locations and one or more sellers. Search pools may be established to affect the search behavior of engines 12 and 14 (according to search rules, described below). The following examples illustrate possible search pools: search pool A includes seller A's newer stock; search pool B includes seller A's older stock; search pool C includes seller B's and seller C's stock (stored in a warehouse that these sellers share); and search pool D includes the stock at a central warehouse. Search rules may be specified for a given seller that identify the search pools that engines 12 and 14 should search when they receive a request associated with a particular seller. The search rules may also specify a penalty for each pool. The penalties indirectly control the number of matches that engines 12 and 14 return from each pool. The search rules for each seller may be completely independent of the search rules for any other seller. For example, any given seller does not have to search all possible inventory and/or production locations. For instance, when the search rules for seller A are established, they do not need to include search pool C.

After engines 12 and/or 14 have identified matches from inventory and/or production information using appropriate matching rules (and associated penalties), reconfiguration rules (and associated penalties), search pools, and/or search rules, engines 12 and/or 14 return their lists of matches (including partial matches) at step 110 to routing/consolidation module 18. At step 112, routing/consolidation module 18 uses appropriate consolidation and filtering logic to combine the lists of matches from multiple engines 12 and/or 14 into one list. For example, routing/consolidation module 18 may combine the results from multiple engines and then order the results according to one or more criteria (such as price, closest match, delivery date, and/or any other appropriate criteria). Routing/consolidation module 18 communicates the combined list to commerce module 16 at step 114. At step 116, commerce module 16 performs any appropriate repricing (based on product option changes, seller discounts or incentive programs, or any other appropriate criteria) and revalidation (to confirm that the matches meet the buyer's configuration within accepted tolerances) and then displays the results to the buyer at step 118. This display may compare the matches to the buyer's specified product configuration and list the availability date and price associated with each match. The display may also show the percentage to which each match meets the desired configuration.

Figure 3:
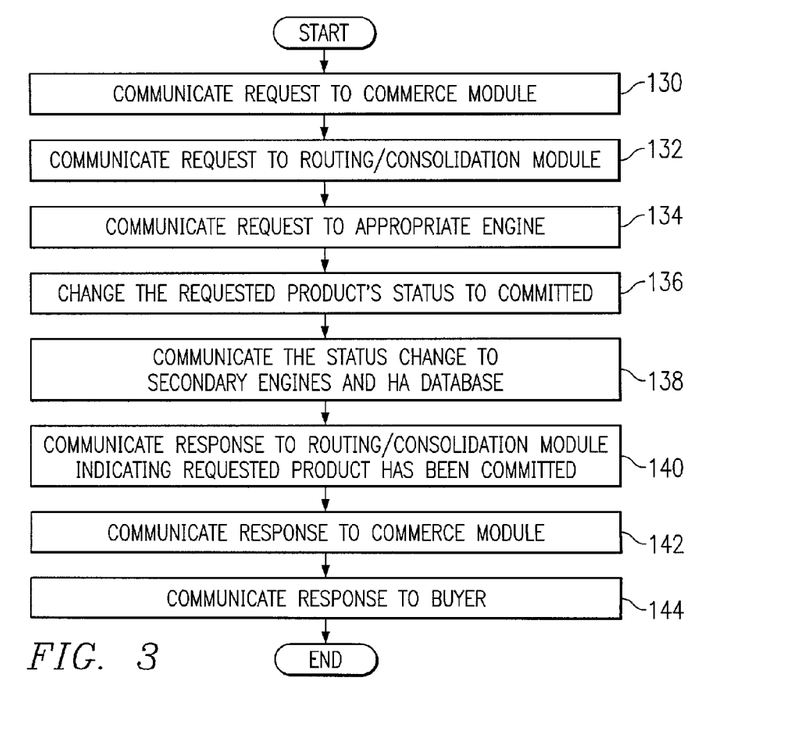
FIG. 3 illustrates an example method for performing a request transaction.

FIG. 3 illustrates an example method for performing a request transaction. When the buyer receives a set of possible product matches in response to a query, the buyer may decide to purchase one of the products. The process of selecting one of products to purchase is a request. The method begins at step 130 when the buyer communicates a request to reserve the item to commerce module 16 (for example, by adding a product match to the shopping cart). Commerce module 16 communicates the request to routing/consolidation module 18 at step 132 and routing/consolidation module 18 communicates the request at step 134 to the engine 12 or 14 from which the requested match was obtained (requests are typically communicated to a primary engine 12 or 14 since they are state-changing transaction). The request may include a match identifier (to identify the particular match), an engine identifier (to identify the engine from which the match was obtained), and a buyer identifier. These identifiers, if used, may be assigned by routing/consolidation module 18 or any other appropriate component of system 10.

At step 136, the primary engine 12 or 14 changes the requested product's status to "committed" (so that it can no longer be returned as a match to a buyer). The primary engine 12 or 14 informs the secondary engine(s) 12 or 14, as well as the HA database(s), to note the change in status at step 138 so that the engines 12 or 14 are synchronized. At step 140, the primary engine 12 or 14 communicates a positive response to routing/consolidation module 18, indicating that the request was successful, and routing/consolidation module 18 communicates this response to commerce module 16 at step 142, which communicates the response to the buyer at step 144. If the request was successful, the item may placed in the buyer's shopping cart along with any other reserved items. It should be noted that there is a possibility that between the time the matches are communicated to the buyer and the time the buyer chooses to request a matched product, the product may have been committed to another buyer. In such a situation, a failure message is sent to the buyer indicating that the buyer should request a different matched product or modify the desired configuration. Furthermore, the matching products may be displayed to the buyer again without the product that could not be reserved. The buyer may choose to reserve a different item or modify his/her configuration and start a new search.

FIG. 4 illustrates an example method for performing a cancellation transaction. A cancellation involves canceling a buyer's request regarding a particular matched product and reverting the product's status from committed back to uncommitted in the appropriate engine 12 or 14. The method begins at step 150 when the buyer communicates a cancellation request regarding a particular committed product to commerce module 16. For example, the buyer may view the products in the buyer's shopping cart and select the product request the buyer would like to cancel. At step 152, commerce module 16 communicates the cancellation request to routing/consolidation module 18. Routing/consolidation module 18 communicates the cancellation request to the appropriate engine 12 or 14 (the engine that committed the product) at step 154. Cancellations are state-changing transaction and thus are typically submitted to a primary engine 12 or 14. At step 156, the primary engine 12 or 14 converts the product's status from "committed" back to "uncommitted." The primary engine 12 or 14 also informs the secondary engine(s) 12 or 14, as well as the HA database(s), to note the change in status at step 158 so that the engines 12 or 14 are synchronized.

At step 160, the primary engine 12 or 14 communicates a positive response to routing/consolidation module 18, indicating that the cancellation was successful, and routing/consolidation module 18 communicates this response to commerce module 16 at step 162, which communicates the response to the buyer at step 164. As an example, the positive response may be communicated to the buyer by an explicit message and/or by displaying the buyer's shopping cart without the canceled product.

FIG. 5 illustrates an example method for performing an order transaction. After a buyer has reserved a product through a product request, the buyer may submit an order for the product to OMS 20. Submitting such as order may represent a financial commitment on the part of the buyer to purchase the product. The method begins at step 170 when the buyer communicates an order request regarding a particular committed product to commerce module 16. For example, the buyer may view the products in the buyer's shopping cart and select the product request the buyer would like to order (or the buyer may order all items in the shopping cart at once). At step 172, commerce module 16 communicates the order to OMS 20 and communicates a confirmation to the appropriate engines 12 and/or 14. OMS 20 processes the order at step 174 and the method ends.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented intelligent order promising system comprising one or more processing units and one or more memory units, the system comprising:
   a commerce module operable to, using one or more processing units and one or more memory units, receive a product inquiry from a user, the product inquiry including a product configuration that comprises a product identifier, one or more option values, and a delivery location for the product;
   one or more inventory engines each operable to, using one or more processing units and one or more memory units:
      receive the product configuration from the commerce module;
      identify one or more products in the inventory of one or more sellers that exactly or partially match the product configuration based on one or more matching rules, the matching rules defining penalties that are incurred if one or more options of the matching product do not exactly match the option values received from the user;
      determine a delivery date for each matching product based, at least in part, on the inventory location of the product and the delivery location for the product; and
      communicate the matching products and associated delivery dates; dates to the commerce module;
   one or more production engines each operable to, using one or more processing units and one or more memory units:
      receive the product configuration from the commerce module;
      identify one or more products in current or planned production that exactly or partially match the product configuration based on one or more matching rules, the matching rules defining penalties that are incurred if one or more options of the matching product do not exactly match the option values received from the user;
      determine a delivery date for each matching product based, at least in part, on the production lead time, production location of the product, and the delivery location for the product; and
      communicate the matching products and associated delivery dates to the commerce module;
   the commerce module further operable to, using one or more processing units and one or more memory units:
      communicate the consolidated matching products and associated delivery dates to the user;
      receive a request for at least one of the matching products from the user; and
      communicate the request to the inventory or production engine that identified the matching product; and
   the inventory or production engine further operable to, using one or more processing units and one or more memory units, receive the request and to commit the requested product to the user.

2. The system of claim 1, wherein the commerce module is further operable to:
   receive a product order from the user identifying a product that has been committed to the user which the user desires to purchase; and
   communicate the order to an order management system associated with the seller of the product.

3. The system of claim 1, wherein the commerce module is further operable to validate the product configuration received from the user.

4. The system of claim 1, wherein the commerce module is further operable to provide an electronic shopping cart to the user, the shopping cart displaying one or more products that have been committed to the user.

5. The system of claim 1 wherein the matching rules comprises production constraints.

6. The system of claim 1, further comprising a routing/consolidation module operable to:
communicate product configurations and requests from the commerce module to appropriate inventory engines and production engines;
consolidate product matches received from the inventory engines and production engines; and
communicate the consolidated product matches to the commerce module.

7. The system of claim 1, wherein the product configuration further comprises a preference level associated with one or more of the option values, the preference level identifying the magnitude of the penalty for a product not exactly matching the associated option value, the penalty influencing whether the inventory engine identifies the product as a matching product.

8. The system of claim 1, wherein the inventory engine also identifies one or more products in the inventory of one or more sellers that exactly or partially match the product configuration based on one or more reconfiguration rules, the reconfiguration rules identifying penalties for reconfiguring options associated with a product to match the option values in the product configuration, the penalties influencing whether the inventory engine identifies the product as a matching product.

9. The system of claim 1, wherein the one or more inventory engines comprise:
a primary inventory engine operable to process inquiries and requests; and
one or more secondary inventory engines operable to process inquiries but not requests; and
a message bus operable to:
receive inquiries and requests from the commerce module;
communicate requests received from the commerce module to the primary inventory engine; and
communicate inquiries received from the commerce module to one of the secondary inventory engines.

10. The system of claim 9, wherein at least one of the secondary inventory engines is operable to become the primary inventory engine in the event the primary inventory engine becomes unavailable.

11. The system of claim 1, wherein one or more products have one or more associated exclusive options groups including a plurality of option values, the product configuration being able to legally include only one option value from each exclusive option group.

12. The system of claim 11, wherein one or more matching rules are associated with each exclusive option group.

13. The system of claim 1, wherein:
the inventory of one or more sellers is divided into a plurality of search pools; and
one or more search rules identify the order in which the one or more inventory engines will search the search pools for products that exactly or partially match the product configuration.

14. A computer-implemented method for intelligent order promising, using a computer system comprising one or more processing units and one or more memory units, the method comprising:
using the computer system, receiving a product inquiry from a user, the product inquiry including a product configuration that comprises a product identifier, one or more option values, and a delivery location for the product;
using the computer system, identifying one or more products in the inventory of one or more sellers that exactly or partially match the product configuration based on one or more matching rules, the matching rules defining penalties that are incurred if one or more options of the matching product do not exactly match the option values received from the user;
using the computer system, determining a delivery date for each matching product based, at least in part, on the inventory location of the product and the delivery location for the product;
using the computer system, identifying one or more products in current or planned production that exactly or partially match the product configuration based on one or more matching rules, the matching rules defining penalties that are incurred if one or more options of the matching product do not exactly match the option values received from the user;
using the computer system, determining a delivery date for each matching product based, at least in part, on the production lead time, production location of the product, and the delivery location for the product; and
using the computer system, communicating the consolidated matching products and associated delivery dates to the user;
using the computer system, receiving a request for at least one of the matching products from the user; and
using the computer system, committing the requested product to the user.

15. The method of claim 14, further comprising:
receiving a product order from the user identifying a product that has been committed to the user which the user desires to purchase; and
communicating the order to an order management system associated with the seller of the product.

16. The method of claim 14, further comprising validating the product configuration received from the user.

17. The method of claim 14, further comprising providing an electronic shopping cart to the user, the shopping cart displaying one or more products that have been committed to the user.

18. The method of claim 14, wherein the matching rules comprises production constraints.

19. The method of claim 14, wherein the product configuration further comprises a preference level associated with one or more of the option values, the preference level identifying the magnitude of the penalty for a product not exactly matching the associated option value, the penalty influencing whether a product is identified as a matching product.

20. The method of claim 14, further comprising identifying one or more products in the inventory of one or more sellers that exactly or partially match the product configuration based on one or more reconfiguration rules, the reconfiguration rules identifying penalties for reconfiguring options associated with a product to match the option values in the product configuration, the penalties influencing whether a product is identified as a matching product.

21. The method of claim 14, wherein one or more products have one or more associated exclusive options groups including a plurality of option values, the product configuration being able to legally include only one option value from each exclusive option group.

22. The method of claim 21, wherein one or more matching rules are associated with each exclusive option group.

23. The method of claim 14, wherein:
the inventory of one or more sellers is divided into a plurality of search pools; and
one or more search rules identify the order in which the search pools are searched for products that exactly or partially match the product configuration.

24. Intelligent order promising software embodied in a computer-readable medium and, when executed, operable to:
receive a product inquiry from a user, the product inquiry including a product configuration that comprises a product identifier, one or more option values, and a delivery location for the product;
identify one or more products in the inventory of one or more sellers that exactly or partially match the product configuration based on one or more matching rules, the matching rules defining penalties that are incurred if one or more options of the matching product do not exactly match the option values received from the user;
determine a delivery date for each matching product based, at least in part, on the inventory location of the product and the delivery location for the product;
identify one or more products in current or planned production that exactly or partially match the product configuration based on one or more matching rules, the matching rules defining penalties that are incurred if one or more options of the matching product do not exactly match the option values received from the user;
determine a delivery date for each matching product based, at least in part, on the production lead time, production location of the product, and the delivery location for the product; and
communicate the consolidated matching products and associated delivery dates to the user;
receive a request for at least one of the matching products from the user; and
commit the requested product to the user.

25. The software of claim 24, further operable to:
receive a product order from the user identifying a product that has been committed to the user which the user desires to purchase; and
communicate the order to an order management system associated with the seller of the product.

26. The software of claim 24, further operable to validate the product configuration received from the user.

27. The software of claim 24, further operable to provide an electronic shopping cart to the user, the shopping cart displaying one or more products that have been committed to the user.

28. The software of claim 24, wherein the matching rules comprises production constraints.

29. The software of claim 24, wherein the product configuration further comprises a preference level associated with one or more of the option values, the preference level identifying the magnitude of the penalty for a product not exactly matching the associated option value, the penalty influencing whether a product is identified as a matching product.

30. The software of claim 24, further operable to identify one or more products in the inventory of one or more sellers that exactly or partially match the product configuration based on one or more reconfiguration rules, the reconfiguration rules identifying penalties for reconfiguring options associated with a product to match the option values in the product configuration, the penalties influencing whether a product is identified as a matching product.

31. The software of claim 24, wherein one or more products have one or more associated exclusive options groups including a plurality of option values, the product configuration being able to legally include only one option value from each exclusive option group.

32. The software of claim 31, wherein one or more matching rules are associated with each exclusive option group.

33. The software of claim 24, wherein:
the inventory of one or more sellers is divided into a plurality of search pools; and
one or more search rules identify the order in which the search pools are searched for products that exactly or partially match the product configuration.

* * * * *